Figure 1:
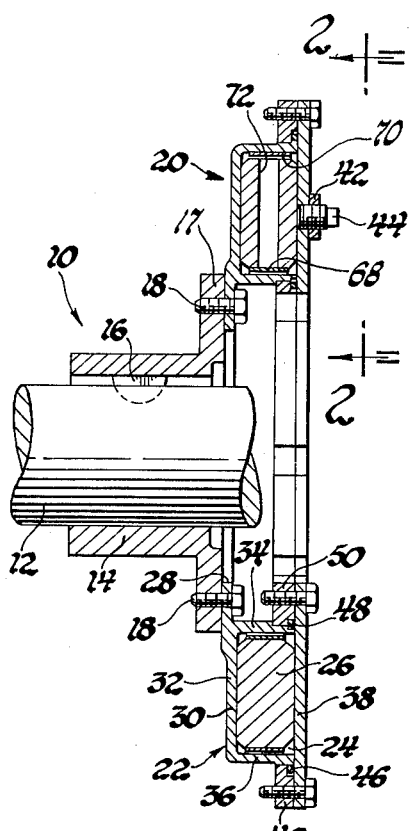

United States Patent [19]

Zander

[11] 4,044,627
[45] Aug. 30, 1977

[54] VISCOUS DAMPER FOR SMOOTHING TORSIONAL AND BENDING VIBRATIONS IN ROTATING SHAFTS

[75] Inventor: Robert W. Zander, Detroit, Mich.

[73] Assignee: General Motors Corporation, Detroit, Mich.

[21] Appl. No.: 662,325

[22] Filed: Mar. 1, 1976

[51] Int. Cl.² ............................................ F16F 15/10
[52] U.S. Cl. ....................................................... 74/574
[58] Field of Search ........................................... 74/577

[56] References Cited
U.S. PATENT DOCUMENTS

| | | | |
|---|---|---|---|
| 2,636,399 | 4/1953 | O'Connor | 74/574 |
| 2,834,225 | 5/1958 | Carter et al. | 74/574 |
| 3,280,654 | 10/1966 | Arnt, Jr. | 74/574 |
| 3,448,530 | 6/1969 | Desmond | 74/574 |
| 3,552,230 | 1/1971 | McLean | 74/574 |

*Primary Examiner*—Samuel Scott
*Assistant Examiner*—Wesley S. Ratliff, Jr.
*Attorney, Agent, or Firm*—Robert J. Outland

[57] ABSTRACT

A viscous vibration damper has a housing mountable on a rotatable shaft such as an engine crankshaft and retaining an annular flywheel weight in a viscous fluid filled sealed chamber. The flywheel is freely movable circumferentially and has sufficient radial clearance to permit substantial lateral movement within the housing, but has axially oppositely facing working surfaces in close shear film spaced relation to confronting surfaces of the housing so as to provide viscous damping for both torsional and radial (or lateral) vibrations. Springs are provided which radially urge the flywheel weight toward a centered position in the chamber and also contribute to the damping effect. The arrangement provides torsional damping and also damps bending vibrations of the connected shaft which result in radial oscillations of the attached housing.

1 Claim, 3 Drawing Figures

VISCOUS DAMPER FOR SMOOTHING TORSIONAL AND BENDING VIBRATIONS IN ROTATING SHAFTS

This invention relates to viscous vibration dampers and, more particularly, to a damper for smoothing torsional and bending vibrations in rotating shafts such as for example the crankshafts of internal combustion engines.

It is known in the art to provide a viscous dampers for smoothing torsional vibrations of rotating shafts, notably the crankshafts of internal combustion engines. Examples of such dampers include the arrangements of U.S. Pat. No. 2,514,139 O'Connor in which a free floating annular flywheel is utilized and the arrangements of U.S. Pat. No. 3,636,399 O'Connor which modifies the previously mentioned construction by resiliently attaching the flywheel to its enclosing housing to provide a tuned damping function in addition to the usual viscous damping effect. Numerous variations of such damper constructions have been proposed or utilized in the prior art for damping torsional vibrations of engine crankshafts and the like.

It is now recognized that in some instances the loads imposed upon engine crankshafts, in addition to causing torsional vibrations, may also cause bending vibrations that result in radial oscillations of the end of the crankshaft, much as the known torsional vibrations result in rotational oscillation of the end of the crankshaft relative to its average rotational speed.

The present invention provides an improved viscous damper construction which modifies the known viscous torsional vibration damper arrangements to provide, in addition to torsional damping, the additional function of damping radial (lateral) vibrations or oscillations of the damper housing. Such a damper, when mounted on the end of an engine crankshaft, tends to smooth or dampen the crankshaft bending vibrations which cause such radial oscillations of the crankshaft end.

Figure 3:
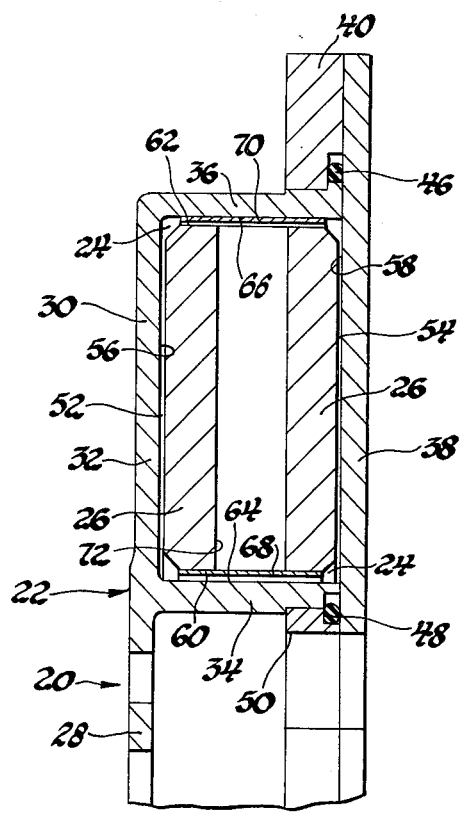
Figure 2:
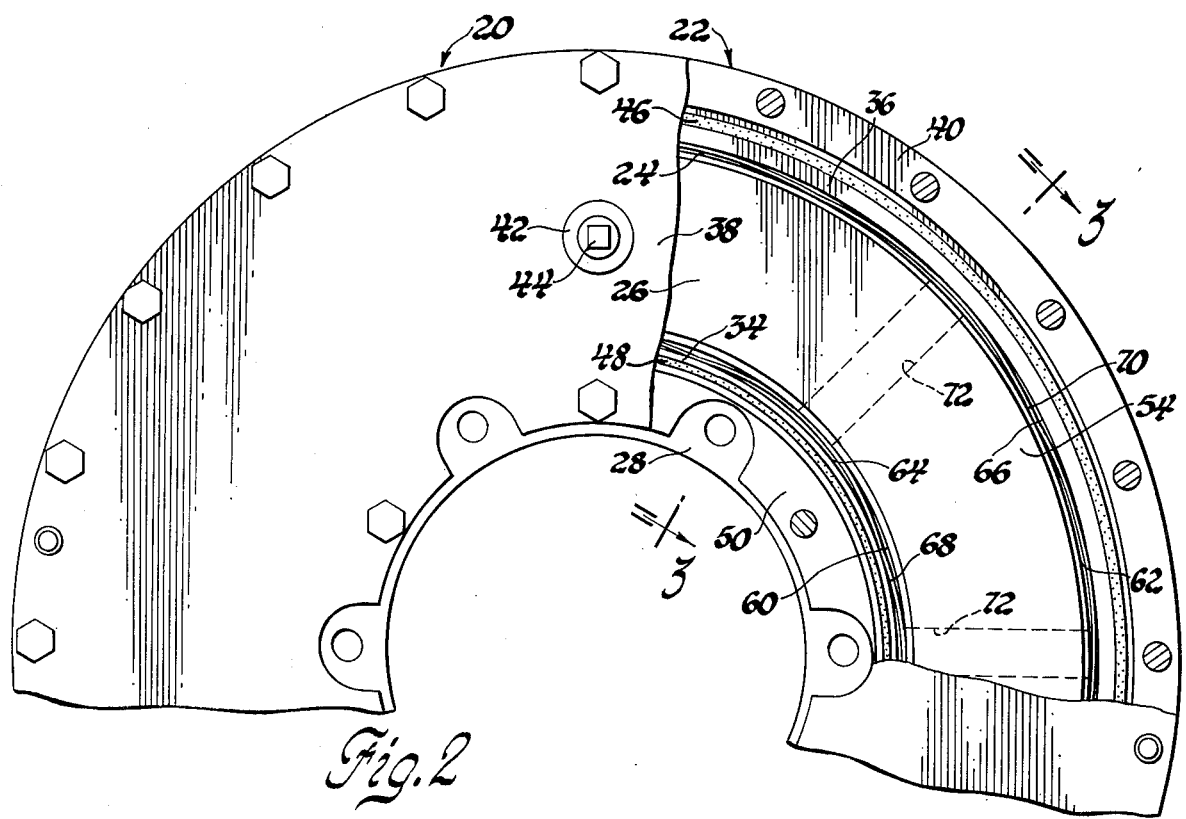

These and other advantages of the present invention will be more fully understood from the following description of a preferred embodiment taken together with the accompanying drawing, in which FIG. 1 is a diametrical sectional view of a crankshaft mounted torsional and bending vibration damper formed according to the invention;

FIG. 2 is a fragmentary elevational view from the plane of the line 2—2 of FIG. 1 having portions broken away to illustrate the internal construction of the damper; and FIG. 3 is an enlarged diametrical view taken generally in the plane indicated by the line 3—3 of FIG. 2.

Referring now to the drawing in detail, numeral 10 generally indicates an internal combustion engine having a crankshaft 12, the end of which is provided with a removable hub 14 fixedly attached to the end of the shaft 12 and keyed thereto, as at 16, to prevent any relative motion between the hub and the shaft.

Mounted on a radial flange 17 of the hub 14 by fastening means such as machine screws 18 is a viscous damper assembly formed according to the present invention and generally indicated by numeral 20. Damper 20 includes a multi-piece housing 22 which may be constructed in any suitable fashion to define an annular working chamber 24 in which there is disposed an annular flywheel or inertia weight 26, rotatably and radially movable within the chamber 24, as will subsequently be more fully described.

In the present instance, the housing includes a main body having an inner flange 28 which is secured to the hub 17 and supports an open sided annular portion 30 having an end wall 32 and integral axially extending concentric inner and outer walls 34, 36, respectively, which define three sides of the annular chamber 24. A removable cover 38 is secured against the ends of the walls 34, 36 and closes the chamber 24, forming the fourth side thereof.

In the illustrated construction, the cover member 38 is retained in place by being secured to a radial flange 40 which is removably attached to the outer periphery of the wall 36. One or more threaded bosses 42, closed by removable plugs 44, are provided in the cover 38 to permit filling of the chamber 24 with a viscous damping fluid of suitable viscosity, such as for example silicone fluid having a viscosity in the range between 60,000 and 500,000 centistokes. The chamber is sealed by the use of annular o-ring seals 46, 48 which are respectively retained in grooved portions of the radial flange 40 and a corresponding inner seal ring 50.

As is best shown in FIG. 3, the annular flywheel ring 26 is provided with oppositely axially facing working surfaces 52, 54 which are closely spaced in shear film spaced relation with confronting internal working surfaces 56, 58, respectively, of the housing end wall 32 and cover 38. The flywheel ring 26 also has radially inwardly and outwardly facing surfaces 60, 62, respectively, which are spaced, with clearances much greater than shear film spacing, from their respective confronting radially facing surfaces 64, 66 of the inner and outer walls 34, 36, respectively. The radial clearance provided is sufficient to permit substantial lateral movement of the flywheel ring 26 within its chamber 24 in order to provide the radial damping characteristics to be subsequently more fully described.

Between the walls 34, 36 and the radially facing surfaces of the flywheel 26 there are provided spring means which in the present instance take the form of annularly extending metal wave or hump springs 68 and 70. These springs include wave-like humps, or deviations from a true annular shape, which are resiliently deformed as installed so that the springs urge the engaged surfaces of the flywheel away from the corresponding confronting surface of the adjacent wall and thus tend to bias the flywheel toward a radially centered position within the chamber 24. If desired, either the inner or outer spring could be deleted ad a single spring utilized. The flywheel may be provided with a plurality of radial passages 72 for aiding passage of the viscous fluid between the inner and outer peripheries of the flywheel.

In operation, rotation of the crankshaft 12 by the engine will result in varying degrees of torsional and bending vibrations which are carried to the end of the crankshaft 12 and apply to the housing 22 of the vibration damper both torsional and radial vibration forces. The relatively free floating action of the flywheel 26 within the cavity 24 permits relative motion between the flywheel and the housing, which sets up viscous forces through the viscous fluid between the shear film spaced confronting axially facing working surfaces 52, 56 and 54, 58 of the flywheel and housing, respectively. Since the flywheel is free to oscillate in both rotational and radial directions, the resisting viscous forces are available to smooth or damp out vibrations in both torsional and radial (or bending) modes. Thus, the viscous action of the damper provides both torsional and bending vibration damping to the crankshaft.

The viscous damping effects are modified in part by the use of the metal wave springs on the inner and or outer peripheries of the flywheel. These springs provide some physical resistance to movement of the flywheel from its centered and nonrotating positions. Thus, they may contribute some friction damping effect. However, when relative rotation of the flywheel occurs, the shape of the springs is such as to provide a wedge action that permits flowing of the viscous fluid between the springs and the radially facing surfaces they engage so that additional viscous damping effect is provided at these points. The action also has the effect of a bearing for supporting rotational motion of the flywheel. Further viscous damping action may be created by pumping of the damping fluid between adjacent pockets formed by the spring convolutions. In addition, the wave springs act to center the flywheel radially within the chamber 24 so that the full spacing for movement of the weight within the chamber is available to provide effective radial damping to offset crankshaft bending vibrations.

While the invention has been disclosed by reference to a specific embodiment to better illustrate its structural and operational features, it should be understood that numerous modifications could be made in the design of the specific elements of vibration dampers formed according to the invention without departing from the inventive concepts disclosed. For example, it is considered that the construction of the housing, the form of flywheel weight, the type of springs used and other features of the present arrangement could be changed by the substitution of known equivalent or similar constructions without departing from the basic concepts inherent in the present disclosure of a unique viscous damper which combines the functions of damping both torsional and radial (or bending) vibrations in an attached shaft. In view of the many possible changes which could be made within the scope of the present invention, it is intended that the invention not be limited except by the language of the following claims.

I claim:

1. A rotary shaft damper for damping torsional and bending vibrations, said damper comprising
   a housing having mounting means and defining an internal annular chamber,
   a flywheel ring floating freely in said chamber and having oppositely axially facing working surfaces in shear film spaced relation to confronting internal working surfaces of the housing, said ring also having a radially facing surface spaced farther than shear film spacing and sufficiently far from a confronting radially facing surface of the housing to permit substantial lateral movement of said ring within said chamber,
   radially yieldable spring means disposed between said radially confronting surfaces and biasing said radially facing ring surface toward a position concentric with said radially facing housing surface and
   viscous damping fluid in said chamber in the spaces between the confronting surfaces of the flywheel and housing,
   said flywheel ring being movable in said chamber a sufficient amount both angularly and laterally relative to said housing to transmit damping forces to said housing through said viscous fluid and said spring means to oppose both torsional and lateral vibrations of said housing, wherein said radially yieldable spring means comprises a metal spring element annularly disposed between said radially confronting surfaces and having alternately oppositely directed humps resiliently deformed by and engaging said confronting surfaces whereby said surfaces are urged apart.

* * * * *